United States Patent
Schwarz et al.

(10) Patent No.: US 8,858,182 B2
(45) Date of Patent: Oct. 14, 2014

(54) FAN BLADE WITH SHEATH

(75) Inventors: Frederick M. Schwarz, Glastonbury, CT (US); Michael A. Weisse, Tolland, CT (US); William R. Graves, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 573 days.

(21) Appl. No.: 13/170,752

(22) Filed: Jun. 28, 2011

(65) Prior Publication Data

US 2013/0004322 A1 Jan. 3, 2013

(51) Int. Cl.
*F01D 5/14* (2006.01)
*F01D 5/28* (2006.01)
*F02K 3/06* (2006.01)

(52) U.S. Cl.
CPC .................. *F01D 5/28* (2013.01); *Y02T 50/672* (2013.01); *Y02T 50/673* (2013.01); *F02K 3/06* (2013.01)
USPC .......................................................... 416/224

(58) Field of Classification Search
CPC .... Y02T 50/671; Y02T 50/672; Y02T 50/673
USPC ........................................................... 416/224
See application file for complete search history.

(56) References Cited

U.S. PATENT DOCUMENTS

| | | | |
|---|---|---|---|
| 4,010,530 A | | 3/1977 | Delgrosso et al. |
| 4,121,894 A | * | 10/1978 | Cretella et al. ............ 416/213 R |
| 4,664,600 A | | 5/1987 | Perry |
| 4,950,375 A | | 8/1990 | Leger |
| 5,141,400 A | | 8/1992 | Murphy et al. |
| 5,725,354 A | * | 3/1998 | Wadia et al. .................. 416/224 |
| 5,782,607 A | | 7/1998 | Smith et al. |
| 5,881,972 A | | 3/1999 | Smith et al. |
| 5,908,285 A | | 6/1999 | Graff |
| 6,004,101 A | | 12/1999 | Schilling et al. |
| 6,471,485 B1 | * | 10/2002 | Rossmann et al. ............ 416/230 |
| 6,994,525 B2 | * | 2/2006 | Weisse et al. ................. 416/233 |
| 7,780,410 B2 | * | 8/2010 | Kray et al. ........................ 416/1 |
| 2010/0008788 A1 | | 1/2010 | Barbee et al. |
| 2010/0014964 A1 | | 1/2010 | Smith et al. |
| 2010/0290913 A1 | | 11/2010 | Carvalho |
| 2011/0033308 A1 | | 2/2011 | Huth et al. |

FOREIGN PATENT DOCUMENTS

| | | |
|---|---|---|
| EP | 0863072 A2 | 9/1998 |
| GB | 1307338 | 2/1973 |
| GB | 2245660 A | 1/1992 |

* cited by examiner

*Primary Examiner* — Ned Landrum
*Assistant Examiner* — Brian O Peters
(74) *Attorney, Agent, or Firm* — Kinney & Lange, P.A.

(57) ABSTRACT

A fan blade includes an airfoil with a leading edge and a trailing edge in a chordwise direction, a root and a tip in a spanwise direction; and a sheath with a solid portion to cover the leading edge and first and second flanks extending in the chordwise direction to bond to the pressure and suction sides of the airfoil, respectively. The dimensions of the sheath are varied with respect to the spanwise direction of the blade.

17 Claims, 3 Drawing Sheets

FAN BLADE WITH SHEATH

BACKGROUND

To reduce aircraft fuel burn, jet engines aim to maximize the bypass ratio. Maximizing the bypass ratio involves making fan flow as large as possible relative to the core engine flow. Increasing fan flow to maximize bypass ratio poses challenges when trying to minimize weight. If the fan becomes too heavy as a result of attempting to maximize the bypass ratio, this can lead to increased fuel consumption.

Using a lightweight material in the blade and restricting the use of a heavier, higher-strength material to only the sheath can help to keep weight down as engine bypass ratio is increased. A way of further reducing the weight of the material used for the blade is by including hollow cavities into the blade or by making it thinner. The sheath can give the blade much of the impact tolerance required to allow the engine to produce the required thrust after hitting medium-sized birds and to allow the engine to be safely shut down after hitting very large sized birds. This tolerance helps to protect against cracking, delamination, deformation and erosion. By decreasing the weight of blades, the weight of the disk spinning the blades and the weight of the containment system (in the case of a catastrophic failure) can also be reduced.

SUMMARY

A fan blade includes an airfoil with a leading edge and a trailing edge in a chordwise direction, a root and a tip in a spanwise direction; and a sheath with a solid portion to cover the leading edge and first and second flanks extending in the chordwise direction to bond to the pressure and suction sides of the airfoil, respectively. The dimensions of the sheath are varied with respect to the spanwise direction of the blade.

DETAILED DESCRIPTION

Figure 1:
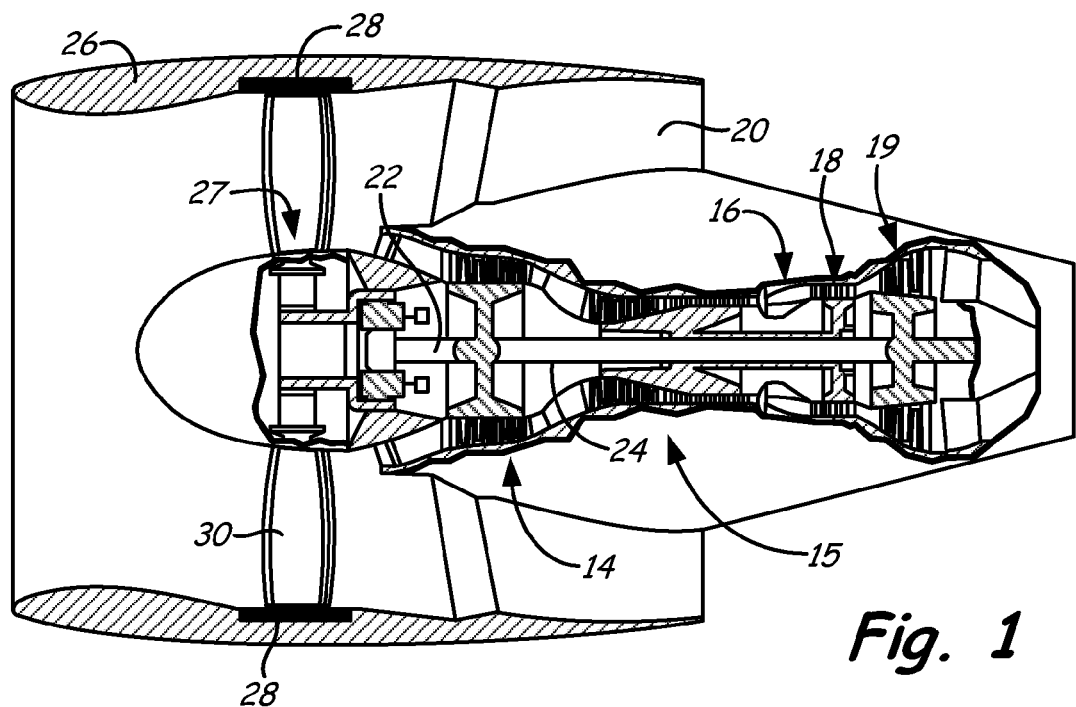
FIG. 1 is a cross-sectional view of a gas turbine engine.

An example dual-spool turbofan engine is depicted in FIG. 1. Turbofan engine 10 comprises several sections: fan section 12, first compressor section 14, second compressor section 15, combustor section 16, first high-pressure turbine section 18, second low-pressure turbine section 19, bypass section 20, low-pressure shaft 22, high-pressure shaft 24 and nacelle 26. Fan section 12 includes disk 27, containment 28 and blades 30. Disk 27 rotates blades 30 to pull in air. A portion of the atmospheric air pulled in by rotation of fan section 12 is directed toward compressor section 14, while the remainder is directed toward bypass section 20.

Air directed through first compressor section 14 is further compressed by second compressor section 15. Fuel is added and ignited in combustor section 16. Blades in turbine section 18 capture a portion of the energy from passing combustion products by turning turbine rotors. Both fan section 12 and first compressor section 14 are rotatably linked via low-pressure shaft 22 to low-pressure turbine section 19. Second high-pressure compressor section 15 is rotatably connected to first high-pressure turbine section 18 via high-pressure shaft 24. Thrust is generated in engine 10 by the force of the air drawn in by fan section 12 and pushed through bypass section 20 (less any bleed air used for other aircraft functions), and by the force of exhaust gases exiting from second low-pressure turbine section 19.

In a turbofan engine, lighter components generally lead to more efficient aircraft performance. If less aircraft fuel is expended to move engine parts, more fuel is available for useful work. At the same time, the components themselves must be strong enough to withstand operational forces, and types of failure typical for the operating environment of the engine. Safety considerations and regulations based on the frequency and/or severity of possible failure will often dictate that the engine components also be able to withstand other atypical, yet foreseeable events. One such event is a catastrophic failure of blade 30. As blade 30 is spun by disk 27, if parts of blade 30 break off, the parts will be launched at high speeds. Containment 28 protects the aircraft from being damages in the event of blade 30 breaking off.

Being designed to pull vast quantities of air through bypass section 20 to generate thrust, blades 30 in fan section 12 are the first line of defense for engine 10 and are highly susceptible to both small and large scale damage from objects pulled in with the surrounding air, including bird impact damage and erosion.

Figure 2:
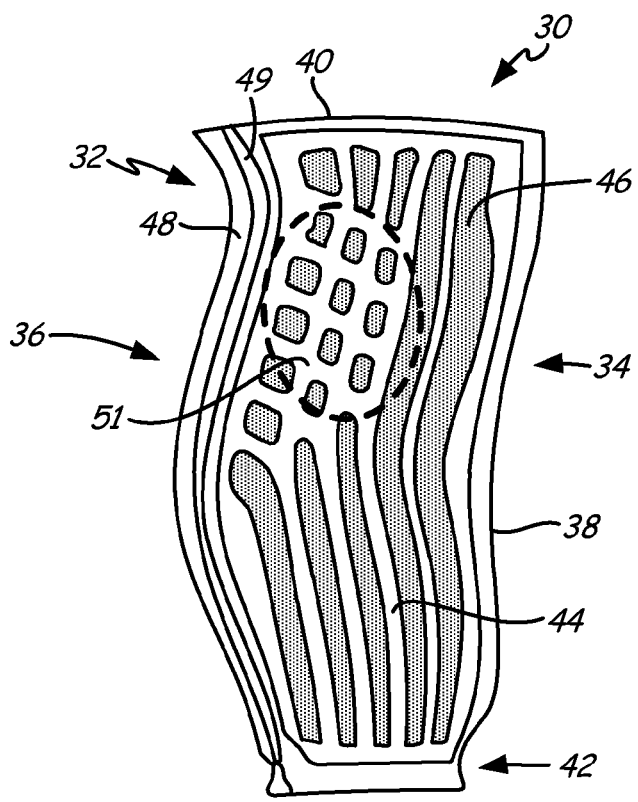
FIG. 2 is a side view of a prior art blade with hollow cavities and a sheath.

FIG. 2 illustrates a prior art blade with a sheath and shading to show where hollow cavities are located within blade. Blade 30 includes airfoil 34 with leading edge 36, trailing edge 38, tip 40, root 42, pressure side 44 and shading for purposes of viewing where hollow cavities 46 are located within blade 30. Hollow cavities 46 are not exposed and can be formed in any way generally known within the art, for example, formed from one side of a blade and then a enclosed by bonding a cover (not shown in FIG. 2) over hollow cavities 46. Sheath 32 includes solid portion 48 covering leading edge 36, and flanks 49 extending from each side of solid portion 48.

Sheath 32 is bonded to blade 30 to cover and protect leading edge 36 of airfoil 34. Bonding can be done using an adhesive to bond flanks 49 to pressure side 44 and suction side (not shown in FIG. 2) of blade 30. Hollow cavities 46 are formed in blade, through machining or any other means in the art to decrease the weight of blade 30. Blade 30 is generally made of aluminum ("Al") or another light-weight metal, and sheath 32 is generally made of titanium ("Ti") or another high strength material.

Sheath 32 acts to protect airfoil 34 from impact loading, such as a bird strike and from erosion. The number and placement of hollow cavities 46 is limited by the strength of airfoil to resist impact loading at specific points from root 42 to tip 40. Portion 51 near leading edge 36, just down from tip 40, hollow cavities 46 are smaller. This is due to portion 51 of blade 30 being most vulnerable to impact loading and needing additional support in that region. Additional support is provided through fewer hollow cavities 46, leaving more solid portions of blade 30 in region 51 to resist impacts. Portion 51 of blade is especially vulnerable to impacts due to the decrease in thickness of blade 30 from root 42 to tip 40 and the increase in rotational velocity of blade 30 from root 42 to tip 40. The increase in rotational velocity from root 42 to tip 40 results in a larger relative momentum when an object impacts blade 30 nearer to tip 40. The decrease in thickness of blade 30 from root to tip 40 results in blade 30 being less able to resist deformations and cracking when impacted closer to tip 40. The outermost section of blade 30 near tip 40 is generally somewhat shielded by a structural part of engine 10, such as nacelle 26. Thus, section 52, at about 70% to about 80% of the span of blade 30 is most vulnerable to cracking and deformation from impacts, so fewer hollow cavities are placed in area 51.

Figure 3:
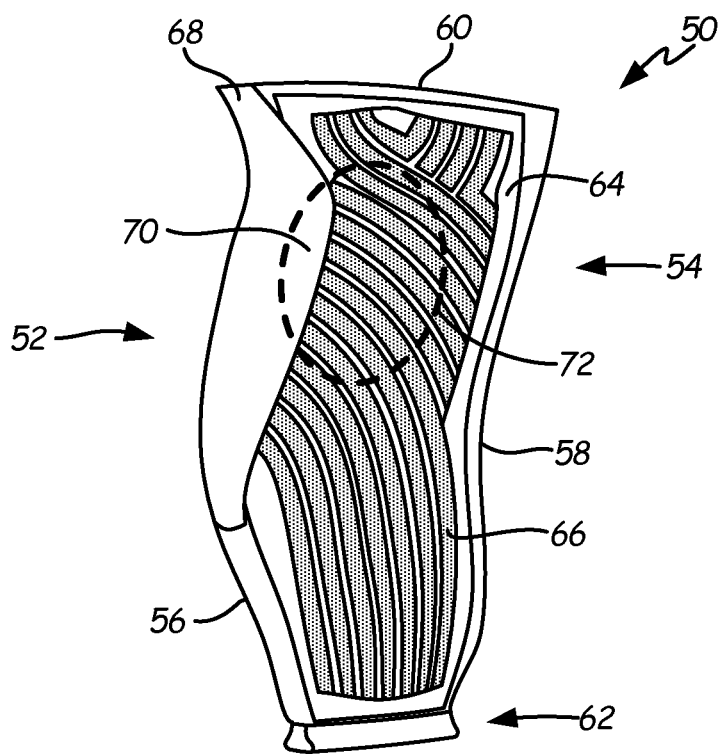
FIG. 3 is a side view of a blade with hollow cavities and a sheath according to the present invention.
Figure 3A:
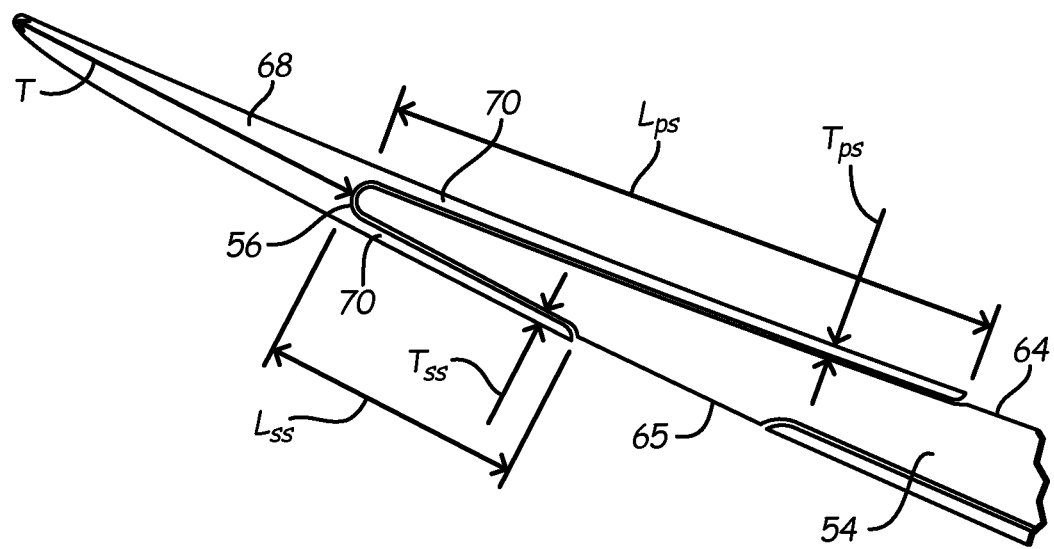
FIG. 3A is a cross-sectional view of the hollow blade with sheath of FIG. 3 from line A-A.

FIG. 3 is a side view of a blade with shading to show locations of hollow cavities within the blade and a sheath according to the present invention. Blade 50 includes airfoil 54 with leading edge 56, trailing edge 58, tip 60, root 62, pressure side 64 and shading for purposes of viewing where hollow cavities 66 are located within blade 50. Sheath 52 includes solid portion 68 covering leading edge 56, and flanks 70 extending from each side of solid portion 68. The cross-sectional view of blade 50 with sheath 52 in FIG. 3A includes sheath solid portion 68 with flanks 70, and airfoil 54 with leading edge 56, pressure side 64, suction side 65 and dimensions T for the thickness of solid portion 68, Lps for the length of flank 70 on pressure side 64, Lss for the length of flank 70 on suction side 65, Tps for the thickness of flank 70 on pressure side, and Tss for the thickness of flank 70 on suction side.

Sheath 52 is bonded onto airfoil 54 using adhesive. Sheath 52 protects leading edge 56 and portions of pressure side 64 and suction side 65 of airfoil 54. Hollow cavities 66 make for a lighter-weight blade than one made of solid metal. Sheath 52 can be titanium or any other material with sufficient strength to protect blade 50 leading edge 56. Blade 50 can be aluminum or another light-weight metal.

Near root 62 of blade 50, sheath dimensions resemble those of prior art sheath 32. This is due to blade 50 being very thick in this region, allowing blade 50 to be able to resist impact damage without the need for a lot of extra protection from sheath 52. When moving in the spanwise direction from root 62 to tip 60 of blade 50, sheath Lps is increased to cover more of pressure side 64, reaching a maximum length around vulnerable area 72 and then decreasing toward tip 60. Region 72 is where blade 50 is most vulnerable to impact damage due to the decreasing thickness of blade 50 from root 62 to tip 60 and the increase in relative velocity between blade 50 and an impact object when moving from root 62 to tip 60. Tip 60 is generally somewhat shielded by an aerodynamic feature of the nacelle 26, leaving it with somewhat less of a need for additional protection than region 72. Sheath dimensions Tps and T could also be increased around region 72 region to improve blade's resistance to impact damage, such as a bird strike.

Sheath 52 dimensions on suction side, Lss and Tss, could be increased proportional to sheath 52 dimensions on pressure side or can be of constant thickness from root 62 of blade 50 to tip 60, depending on blade requirements. Sheath 52 dimensions on suction side can alternatively be uniform, resembling sheath 32 of the prior art, depending on the needs of the blade and engine.

Sheath 52 varies dimensions T, Lps, Lss, Tps and Tss when moving in the spanwise direction from root 62 to tip 60 to protect blade 50 from impact damage while allowing total weight of blade 50 and sheath 52 to be reduced and minimized. The dimensions are tailored to protect blade 50 where it is most vulnerable to impact loading, allowing hollow cavities 66 to be expanded throughout blade 50. This results in a lighter total weight of blade 50 and sheath 52.

Figure 4:
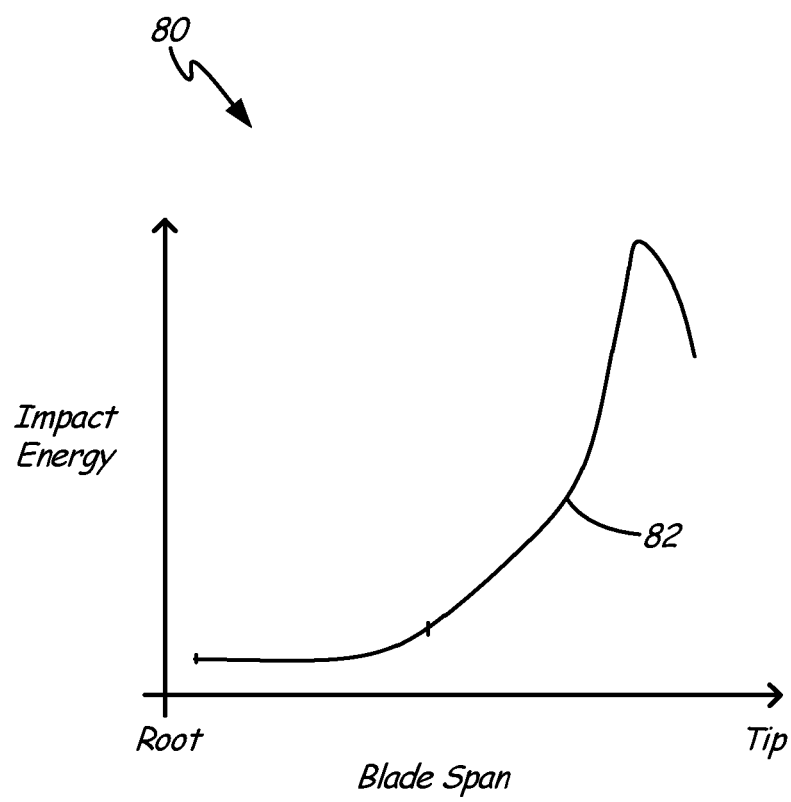
FIG. 4 is a graph representing the impact energy over the span of the blade from root to tip.

FIG. 4 is a graph representing the impact energy over the strength needed through span of the blade from root to tip. Graph 80 includes: x-axis of blade 50 span from root 62 to tip 60, Y-axis of impact energy taking into account impact object momentum and thickness of blade 50 and line 82 representing impact energy throughout span of blade 50.

As can be seen in graph 80, impact energy on blade at root is very low due to: a low relative velocity between blade 50 and impact object due to root 62 being close to center of rotation. Additionally, blade 50 is very thick near root 62, making blade more able to resist impact damage without the need for additional protection. When moving toward blade 50 tip 60 on line 82, impact energy increases at a very great rate due to the relative velocity increasing and blade 50 thickness decreasing. At tip 60 of blade 50 span, impact energy is reduced due to shielding of tip 60 by structural members of engine, such as fan casing or nacelle.

This graph is an example of a formula for varying sheath dimensions to protect blade 50 while minimizing total weight of blade 50 and sheath 52. As line 82 shows that impact energy through span of blade 50 is non-linear, sheath strength can be tailored to be correspondingly non-linear and proportional to the extra strength needed to resist impact energy in every region of blade 50. Sheath dimensions can be increased to further protect blade 50 in regions where impact energy is highest. Conversely, dimensions can be kept minimal where impact energy in lowest, decreasing overall weight.

In summary, varying sheath dimensions to correspond to blade needs at different points from root 62 to tip 60 of blade 50 can maintain blade 50 strength while decreasing overall weight of blade 50 and sheath 52. Dimensions Ts, Lps, Lss, Tps and Tss can be tailored to increase or decrease corresponding to the impact energy a foreign object would impart on blade 50 at any given point through the span of blade 50. This can allow for sheath 52 to protect blade 50 at vulnerable areas, allowing for an increase in hollow cavities to decrease blade 50 weight. The decrease in weight of blade 50 and sheath 52 can decrease the entire weight of engine 10 as well, allowing for a decrease in the weight of the disk that holds blade 50 due to a decrease in pull from the lighter blade 50. Additionally, this can lead to a decrease in the weight of the containment system that prevents a broken blade from impacting the aircraft due to a lighter blade 50 having less momentum and therefore being easier to contain.

While blade has been discussed in relation to being made of a light-weight metal such as Al, blade 50 can be made of composite material. In an organic matrix composite blade, the thickness of the blade could be varied from root to tip to decrease weight instead of including hollow cavities. Even if made of a light-weight material such as Al, blade could be solid without hollow cavities.

While blade had been referred to as typically being made of Al, this can include aluminum alloys and other lightweight material. Additionally, while sheath has been referred to as generally being made of Ti, this includes titanium alloys and other high strength material including stainless steel and nickel alloys.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A fan blade comprising:
   an airfoil with a leading edge and a trailing edge in a chordwise direction, a root and a tip in a spanwise direction; and a sheath with a solid portion to cover the leading edge and first and second flanks extending in the chordwise direction to bond to the pressure and suction sides of the airfoil, respectively, wherein the dimensions of the sheath are nonlinearly varied with respect to the spanwise direction of the blade between 70% and 80% along the spanwise direction from the root;

wherein one of the first and second flanks increases to a maximum length that is located between 70% and 80% along the spanwise direction from the root.

2. The blade of claim 1, wherein the dimensions varied comprise the lengths which the first and second flanks extend in the chordwise direction.

3. The blade of claim 1, wherein in the dimensions varied comprise the thickness of the first and second flanks.

4. The blade of claim 1, wherein the dimensions varied comprise the thickness of the solid portion covering the leading edge.

5. The blade of claim 1, wherein the airfoil has at least one hollow cavity.

6. The blade of claim 1, wherein the blade comprises a composite material.

7. A sheath for a fan airfoil having a leading edge and a trailing edge in a chordwise direction, a root and a tip in a spanwise direction, a pressure side and a suction side, the sheath comprising:

a solid portion to cover the leading edge, the solid portion having a thickness covering the leading edge that varies along the spanwise direction;
a first flank to bond to the pressure side and
a second flank to bond to the suction side;
wherein one of the first flank and the second flank increases to a maximum length that is located between 70% and 80% along the spanwise direction from the root.

8. The sheath of claim 7, wherein the second flank is varied in length in the chordwise direction along the spanwise direction.

9. The sheath of claim 7, wherein the first and second flanks are varied in thickness.

10. The sheath of claim 7, wherein the first flank is varied in length to cover portions of the pressure side most vulnerable to impact damage.

11. The sheath of claim 7, wherein the first flank is varied in length in the chordwise direction from root to tip of the blade.

12. The sheath of claim 7, wherein the sheath is configured to be attached to a fan airfoil comprised of a composite material.

13. A fan blade comprising:

an airfoil with at least one hollow cavity, a leading edge, a trailing edge, a suction side, a pressure side, a root and a tip; and
a sheath bonded to the airfoil leading edge, wherein the sheath dimensions are varied from root to tip to protect against impacts to the blade, wherein the sheath comprises:
a solid portion that covers the leading edge;
a first flank bonded to the pressure side of the airfoil; and
a second flank bonded to the suction side of the airfoil;
wherein one of the first flank and the second flank increases to a maximum length that is located between 70% and 80% along the spanwise direction from the root.

14. The blade of claim 13, wherein the dimensions varied comprise one or more a thickness of the solid portion covering the leading edge, a thickness of the first flank and a thickness of the second flank.

15. The blade of claim 14, wherein the dimensions are non-linearly varied along the blade with respect to a spanwise direction of the blade.

16. The blade of claim 14, wherein the first flank is varied in length to cover portions of the pressure side most vulnerable to impact damage.

17. The blade of claim 13, wherein the dimensions varied comprise one or more of a length of the first flank across the pressure side of the blade and a length of the second flank across the suction side of the blade.

* * * * *